United States Patent
Pande et al.

(10) Patent No.: US 8,023,577 B2
(45) Date of Patent: Sep. 20, 2011

(54) SYSTEMS AND METHODS FOR EFFICIENT CHANNEL CLASSIFICATION

(75) Inventors: Tarkesh Pande, Dallas, TX (US); Deric W. Waters, Dallas, TX (US); Srinath Hosur, Plano, TX (US); Anuj Batra, Dallas, TX (US)

(73) Assignee: Texas Instruments Incorporated, Dallas, TX (US)

( * ) Notice: Subject to any disclaimer, the term of this patent is extended or adjusted under 35 U.S.C. 154(b) by 869 days.

(21) Appl. No.: 12/024,029

(22) Filed: Jan. 31, 2008

(65) Prior Publication Data

US 2008/0187032 A1 Aug. 7, 2008

Related U.S. Application Data

(60) Provisional application No. 60/887,860, filed on Feb. 2, 2007.

(51) Int. Cl.
*H04B 17/00* (2006.01)
*H04B 3/46* (2006.01)
*H04Q 1/20* (2006.01)

(52) U.S. Cl. .................................... 375/260; 375/316

(58) Field of Classification Search ................ 375/316, 375/260; 455/266, 464, 450; 370/210, 208, 370/464

See application file for complete search history.

(56) References Cited

U.S. PATENT DOCUMENTS

| | | | |
|---|---|---|---|
| 2002/0086648 A1* | 7/2002 | Wilhelmsson et al. | 455/101 |
| 2005/0077889 A1* | 4/2005 | Toporski et al. | 324/76.19 |
| 2006/0171492 A1 | 8/2006 | Behzad et al. | |
| 2007/0032199 A1* | 2/2007 | Chang et al. | 455/69 |
| 2007/0183523 A1* | 8/2007 | Koo et al. | 375/261 |
| 2007/0195811 A1* | 8/2007 | Basson et al. | 370/441 |
| 2007/0258531 A1* | 11/2007 | Chen et al. | 375/261 |
| 2007/0270108 A1 | 11/2007 | Kim et al. | |
| 2008/0031368 A1* | 2/2008 | Lindoff et al. | 375/260 |
| 2008/0080635 A1* | 4/2008 | Hugl et al. | 375/267 |

FOREIGN PATENT DOCUMENTS

| | | |
|---|---|---|
| WO | 2005032035 A1 | 4/2005 |
| WO | 2005122506 A1 | 12/2005 |
| WO | 2006102744 A1 | 10/2006 |

(Continued)

OTHER PUBLICATIONS

Klaus Witrisal, "On estimating the RMS delay spread from the frequency-domain level crossing rate", Delft University of Technology, The Netherlands, 2001 IEEE.*

(Continued)

*Primary Examiner* — Chieh M Fan
*Assistant Examiner* — Aristocratis Fotakis
(74) *Attorney, Agent, or Firm* — Steven A. Shaw; W. James Brady; Frederick J. Telecky, Jr.

(57) ABSTRACT

Embodiments provide a system and method for efficiently classifying different channel types in an orthogonal frequency division multiplexing (OFDM) system. Embodiments quantify the frequency selectivity in a channel by measuring the variation in a particular channel statistic across sub-carriers in an OFDM system, involve minimal complexity in implementation, and can be used in a variety of scenarios. One embodiment is a method for classifying channels in an OFDM system, comprising measuring variation of at least one channel statistic across sub-carriers, quantifying the variation to determine a measurement value, and applying the measurement value to at least one threshold to classify the channel.

7 Claims, 3 Drawing Sheets

FOREIGN PATENT DOCUMENTS

| | | |
|---|---|---|
| WO | 2007053954 A1 | 5/2007 |
| WO | 2007111457 A1 | 10/2007 |

OTHER PUBLICATIONS

Barg, A. and Nogin,D. Y., "Bounds on Packings of Spheres in the Grassmann Manifold," IEEE Trans. Info. Th., Sep. 2002, pp. 2450-2454, vol. 48, No. 9.

Erceg, V., et al., "IEEE P802.11, Wireless LANs, TGn Channel Models", IEEE 802.11-03/940r4, May 10, 2004, 45 pp.

Khaled, N., et al., "Interpolation-Based Multi-Mode Precoding for MIMO-OFDM Systems," 4 p., presented at European Signal Processing Conference (EUSIPCO), Antalya, Turkey, Sep. 4-8, 2005; paper obtained from authors' website http://users.ece.utexas.edu/~rheath/papers/2005/eusipco/.

Simoens, S.. et al., "Error Prediction for Adaptive Modulation and Coding in Multiple-Antenna OFDM Systems", Signal Processing, Jan. 10, 2005, 17 pp.

IEEE P802.11 2 Draft Amendment to Standard for Information Technology—Telecommunications and Information Exchange Between Systems—Local and Metropolitan Networks-Specific Requirements—Part 11: Wireless LAN Medium Access Control (MAC) and Physical Layer (PHY) Specifications: Enhancements for Higher Throughput, prepared by the 802.11 Working Group of the 802 Committee; pp. 159-161; and 216-220.

* cited by examiner

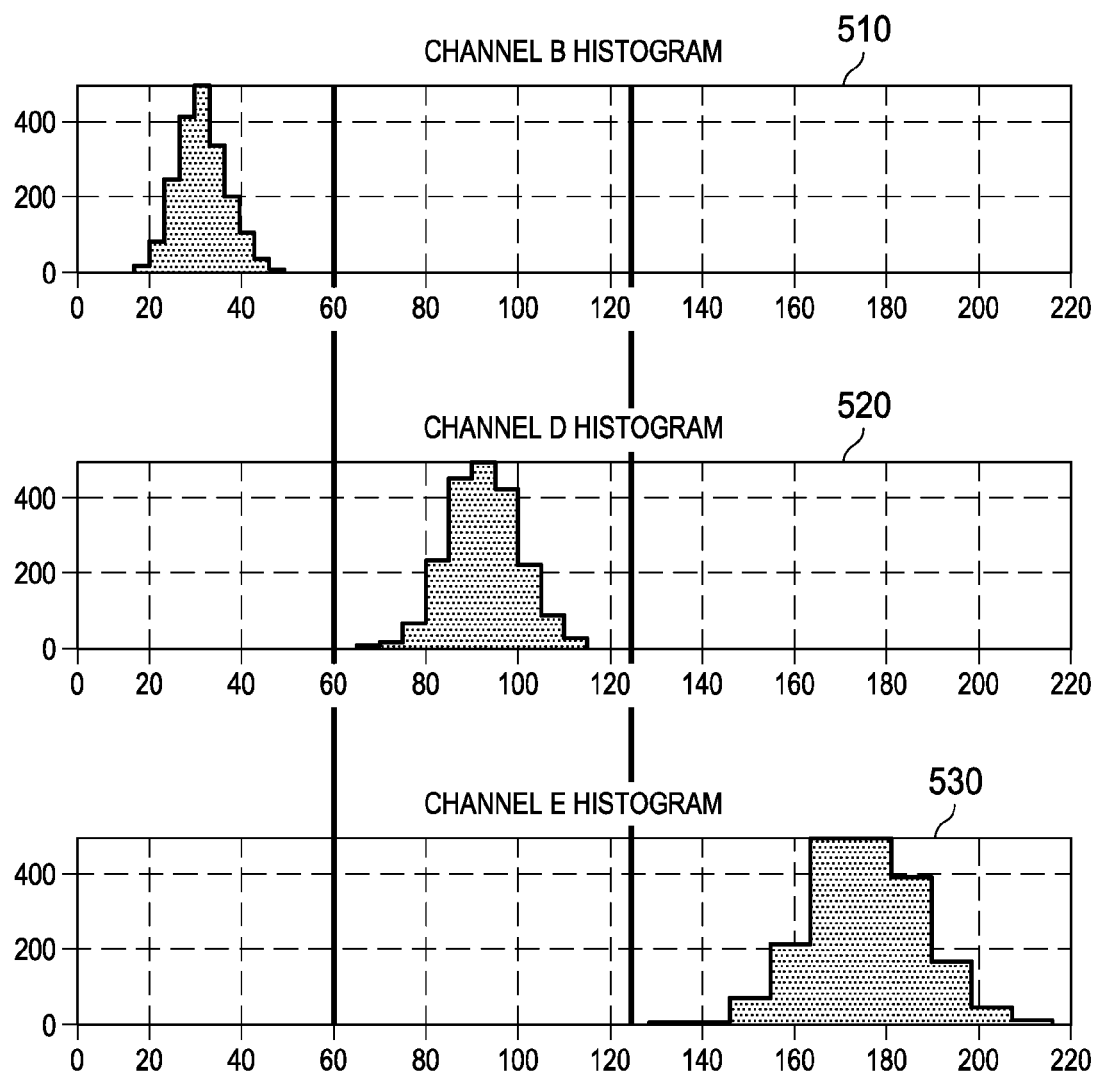

SYSTEMS AND METHODS FOR EFFICIENT CHANNEL CLASSIFICATION

CROSS-REFERENCE TO RELATED APPLICATION

The present application claims priority to U.S. provisional patent application Ser. No. 60/887,860, filed Feb. 2, 2007, and entitled "Efficient Channel Classifier", hereby incorporated herein by reference.

BACKGROUND

As consumer demand for high data rate applications, such as streaming video, expands, technology providers are forced to adopt new technologies to provide the necessary bandwidth. Multiple Input Multiple Output ("MIMO") is an advanced radio system that employs multiple transmit antennas and multiple receive antennas to simultaneously transmit multiple parallel data streams. Relative to previous wireless technologies, MIMO enables substantial gains in both system capacity and transmission reliability without requiring an increase in frequency resources.

MIMO systems exploit differences in the paths between transmit and receive antennas to increase data throughput and diversity. As the number of transmit and receive antennas is increased, the capacity of a MIMO channel increases linearly, and the probability of all sub-channels between the transmitter and receiver fading simultaneously decreases exponentially. As might be expected, however, there is a price associated with realization of these benefits. Recovery of transmitted information in a MIMO system becomes increasingly complex with the addition of transmit antennas. This becomes particularly true in MIMO orthogonal frequency-division multiplexing (OFDM) systems. Such systems employ a digital multi-carrier modulation scheme using numerous orthogonal sub-carriers. While OFDM systems offer many advantages, they are quite sensitive to frequency synchronization problems.

Improvements are desired to achieve a favorable performance-complexity trade-off compared to existing MIMO detectors.

BRIEF DESCRIPTION OF THE DRAWINGS

For a detailed description of exemplary embodiments of the invention, reference will be made to the accompanying drawings in which:

FIG. 5 is a histogram of channel classification in an example MIMO system according to embodiments.

NOTATION AND NOMENCLATURE

Figure 1:
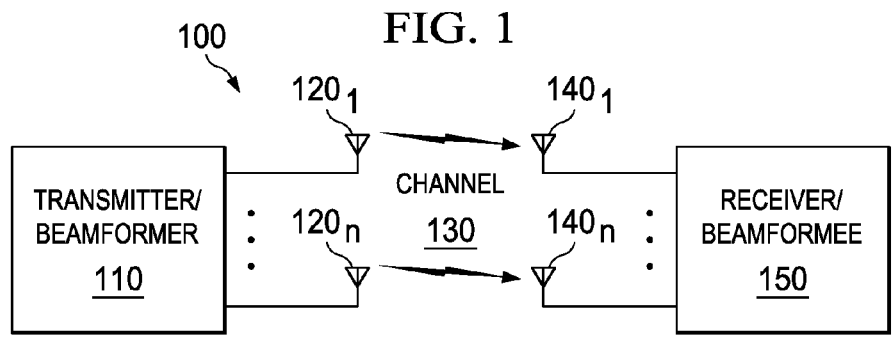
FIG. 1 illustrates an example multiple-input multiple-output orthogonal frequency-division multiplexing (MIMO-ODFM) system in which embodiments may be used to advantage.

Certain terms are used throughout the following description and claims to refer to particular system components. As one skilled in the art will appreciate, computer companies may refer to a component by different names. This document does not intend to distinguish between components that differ in name but not function. In the following discussion and in the claims, the terms "including" and "comprising" are used in an open-ended fashion, and thus should be interpreted to mean "including, but not limited to . . . ." Also, the term "couple" or "couples" is intended to mean either an indirect or direct electrical connection. Thus, if a first device couples to a second device, that connection may be through a direct electrical connection, or through an indirect electrical connection via other devices and connections. The term "system" refers to a collection of two or more hardware and/or software components, and may be used to refer to an electronic device or devices or a sub-system thereof. Further, the term "software" includes any executable code capable of running on a processor, regardless of the media used to store the software. Thus, code stored in non-volatile memory, and sometimes referred to as "embedded firmware," is included within the definition of software.

DETAILED DESCRIPTION

It should be understood at the outset that although exemplary implementations of embodiments of the disclosure are illustrated below, embodiments may be implemented using any number of techniques, whether currently known or in existence. This disclosure should in no way be limited to the exemplary implementations, drawings, and techniques illustrated below, including the exemplary design and implementation illustrated and described herein, but may be modified within the scope of the appended claims along with their full scope of equivalents.

In light of the foregoing background, embodiments enable improved detection by orthogonal frequency divisional multiplexing (OFDM) systems by providing a system and method for efficiently classifying different channel types by an OFDM system. For ease of discussion, one variety of OFDM system—one which uses a multiple-input multiple-output (MIMO) detector—will be more often discussed. However, it should be readily understood that embodiments may also be employed for classifying channels regardless of number of antennas at the transmitter or receiver.

Embodiments quantify the frequency selectivity in a channel by measuring the variation in a particular channel statistic across sub-carriers in an OFDM system, involve minimal complexity in implementation, and can be used in a variety of scenarios. Some embodiments measure variation or the rate of variation in the channel by taking the difference in the channel magnitude/angle between adjacent sub-carriers in the frequency domain and counting the number of zero crossings; the channel type is determined based on a threshold. It should be understood that channel magnitude/angle are a particular example of a channel statistic.

Although embodiments will be described for the sake of simplicity with respect to wireless communication systems, it should be appreciated that embodiments are not so limited, and can be employed in a variety of communication systems.

To better understand embodiments of this disclosure, it should be appreciated that in a MIMO-OFDM system the received signal for every sub-carrier can be modeled by $$r_i = H_i a_i + n_i \quad i=1, \ldots, N_{sub}$$

where $H_i$ is the $N_{tx} \times N_{tx}$ channel matrix for the $i^{th}$ sub-carrier, $a_i$ is a transmitted data or signal vector, $n_i$ is additive noise and $N_{sub}$ denotes the number of sub-carriers.

FIG. 1 depicts an example MIMO-OFDM system 100 which has the capability of adapting a signal to be transmitted to the channel. In other words, transmitter or the beamformer 110 transmits on the dominant modes of channel 130 based on information from receiver 150 (otherwise known as the beamformee 150). As this is a MIMO system, multiple antennas $120_a$-$120_n$ of beamformer 110 transmit a signal to be received by multiple antennas 140a-140n of beamformee 150.

The ability to effectively classify the type of channel across which a transmitter/receiver pair is communicating is important for a variety of reasons. Three examples are presented below.

1) Modulation and Coding Scheme (MCS) Selection: In MIMO-OFDM systems (an example of which is the I.E.E.E. 802.11n wireless LAN standard [IEEE P802.11 Draft Amendment to Standard for Information Technology-Telecommunications and Information Exchange Between Systems—Local and Metropolitan Networks—Specific Requirements", Part 11: Wireless LAN Medium Access Control (MAC) and Physical Layer (PHY) specifications: Enhancements for Higher Throughput]), the performance of a particular modulation and coding scheme (MCS) is channel dependant as described in Sebastian Simoens, Stephanie Rouquette-Leveil, Philippe Sartori, Yufei Blankenship, Brian Classon, "Error prediction for adaptive modulation and coding in multiple-antenna OFDM systems" *Signal Processing*, vol 86, pp. 1911-1919 August 2006. In scenarios where there is sufficient diversity, coding across the tones results in a significant improvement in performance. Link quality metrics (LQM) try to predict the performance of an MCS for a given channel. The calibration of how the LQM will perform for different MCSs may be characterized offline for the different channel types. Then, decision rules can be stored that use the channel type to determine which MCS to use in a given scenario.

2) Explicit Transmit Beamforming: In explicit transmit beamforming, beamformee 150 sends beamformer 110 quantized steering matrices or quantized channel information. Beamformer 110 then uses this explicit feedback information to adapt the signal to the particular channel 130 based on that channel's type. For example, it is known that channels with low frequency selectivity (a type of channel) require less explicit feedback because transmitter or beamformer 110 can reuse the information from one subset of sub-carriers to adapt the signals on all sub-carriers with little performance degradation, as described in N. Khaled, R. W. Heath Jr., B. Mondal, G. Leus, and F. Petre, "Interpolation-based unitary preceding for spatial multiplexing MIMO-OFDM systems," *Proc. of the European Signal Processing Conference*, Antalya, Turkey, Sep. 4-8, 2005. This can result in a significant reduction in the number of feedback bits needed to deliver the explicit feedback.

3) Implicit Transmit Beamforming: In implicit transmit beamforming, beamformer 110 learns the channel via cooperation with beamformee 150 by assuming the physical channel between the antennas is reciprocal (the channel from each transmit antenna to each receive antenna is the same in both directions). Again, for channels that exhibit low frequency selectivity, the steering matrices can be computed for only a subset of the sub-carriers and reused for the other sub-carriers resulting in a significant reduction in computational complexity.

The above examples motivate the need for having a classifier capable of distinguishing between different channel types, and doing so in an efficient manner. For embodiment discussions, the channel matrices $H_i$ for $i=1 \ldots N_{sub}$ will be assumed to be known, and used as an input to the channel classifier. A set of channel statistics, $s_i$ for $i=1 \ldots N_{sub}$, will be determined and will be the input for classifying the channel.

The channel statistic $s_i$ for each sub-carrier can be either a scalar or a vector depending upon the type of statistic under consideration. Some examples, but not by way of limitation, of channel statistics are magnitude, singular values, steering matrices' angular information, and distance of the steering matrices from a reference matrix. These types of channel statistics will be discussed more in detail below.

In some embodiments, the channel statistic of interest is magnitude. In such embodiments, the relevant statistic for each sub-carrier is given by $$s_i = f(|H_i|) \; i=1, \ldots, N_{sub}$$

or any function of $|H_i|$ such as $|H_i|^2$ or $\alpha |H_i|$, where $|H_i|$ is the channel magnitude matrix, and $f(\bullet)$ is a general function. Some examples of $f(\bullet)$ include but are not limited to vec which is the mathematical operation that stacks the columns of a matrix on top of each other, computing the arithmetic mean of $|H_i|$, computing the geometric mean of $|H_i|$, computing the norm of $|H_i|$, etc. In channel types with high frequency selectivity there is a high rate of variation in the channel magnitude for all transmit/receive links across the sub-carriers.

In other embodiments, the channel statistics of interest are singular values. In such embodiments, the singular value decomposition (SVD) of a $N_{rx} \times N_{tx}$ channel matrix $H_i$ with rank p is defined as:

$$H_i = U_i \Sigma_i V_i^* \; i=1 \ldots N_{sub},$$

where $U_i$ and $V_i$ are $N_{rx} \times N_{rx}$ and $N_{tx} \times N_{tx}$ unitary matrices respectively, and $\Sigma_i$ are the $N_{rx} \times N_{tx}$ diagonal matrices containing the singular values $\sigma_{i1} \ldots \sigma_{ip}$ on the main diagonal. The singular values are typically computed in order to determine the optimal bit loading and power loading strategies in a MIMO system. They also form a sufficient statistic for the classifier with $$s_i = [\sigma_{i1} \ldots \sigma_{ip}]^T \; i=1, \ldots, N_{sub}$$

or where $s_i$ is any function of the singular values $(\sigma_{i1}, \ldots, \sigma_{ip})$. As an example, and not by way of limitation, some functions that can be used are arithmetic mean of $(\sigma_{i1}, \ldots, \sigma_{ip})$ geometric mean of $(\sigma_{i1}, \ldots, \sigma_{ip})$, maximum singular value in the set $(\sigma_{i1}, \ldots, \sigma_{ip})$, etc.

In further embodiments, the channel statistic of interest is the angular information of the steering matrices. In explicit transmit beamforming as specified in the 802.11n standard (supra), the receiver parameterizes steering matrices by pairs of angles $(\Phi, \Psi)$ obtained through Givens rotations. The number of pairs of angles given by q depends on the dimensions of the steering vector. As an example, for $$N_{rx} = N_{tx} = 2 \; q=1, \quad \text{a)}$$

$$N_{rx} = N_{tx} = 3 \; q=3, \quad \text{b)}$$

$$N_{rx} = N_{tx} = 4 \; q=6. \quad \text{c)}$$

These angles are quantized and fed back to the transmitter where the steering vector is reconstructed. In this case, the relevant statistic for each sub-carrier is given by $$s_i = [\phi_{i1}, \ldots, \phi_{iq}, \psi_{i1}, \ldots, \psi_{iq}]^T \; i=, \ldots, N_{sub},$$

or where $s_i$ is any function of the Givens Rotation angles $(\phi_{i1} \ldots \phi_{iq}, \psi_{i1} \ldots \psi_{iq})$.

It should be understood that in channels with high frequency selectivity, there is a higher rate of variation in the angles across the sub-carriers.

In some embodiments, the channel statistic of interest is the distance of the steering matrices. The distance of the optimal steering matrices for all the sub-carriers with respect to a reference orthonormal matrix (one example is the matrix constructed using the columns of the identity matrix) can also be used. Let E be the reference matrix and $V_i$ the optimal steering matrix. Then, some examples of distance metrics $d(E, V_i)$ are, as described in A. Barg and D. Y. Nogin, "Bounds on packings of spheres in the Grassmann Manifold," *IEEE Trans. Info. Th.*, vol. 48, pp. 2450-2454, Sep. 2002:

$$\text{Chordal Distance} = 2^{-1/2}\|E^*E - V_i^*V_i\|_F \quad \text{A)}$$

$$\text{Fubini-Study Distance} = \arccos|\det EV_i^*| \quad \text{B)}$$

$$\text{Projection 2-norm Distance} = \|E^*E - V_i^*V_i\|_2 \quad \text{C)}$$

Note that embodiments where the channel statistic of interest is the distance of the steering matrices, the channel statistic for each sub-carrier is given by $$s_i = d(E, V_i) \quad i = N_{sub},$$

or any function of $d(E, V_i)$. The channel statistic $s_i$ can also be a function of the different distance metrics defined above. For channels where there is higher frequency selectivity, the distance metrics between the reference and steering vectors vary more across sub-carriers.

It should be noted that the above-mentioned channel statistics are not unique and others can be used, e.g., using phase information instead of magnitude as shown in case 1, employing a matrix distance norm comparison of the channel matrices with respect to a reference matrix, etc. It should be appreciated that the channel statistic(s) can also be chosen from a combination of the above-mentioned statistics (e.g., magnitude, phase, Givens rotation angles, singular values, and distance metrics) or any function thereof.

Channel classifier embodiments quantify the frequency selectivity in a channel by measuring the variation or rate of variation in a predetermined or desired channel statistic across sub-carriers. As an example, and not by way of limitation, one could broadly categorize the channel as having:

High frequency selectivity—channels that change significantly from sub-carrier to sub-carrier and hence have a lot of frequency diversity Medium frequency selectivity—channels which have some change from sub-carrier to sub-carrier Low frequency selectivity—channels which do not change significantly from sub-carrier to sub-carrier.

Figure 2:
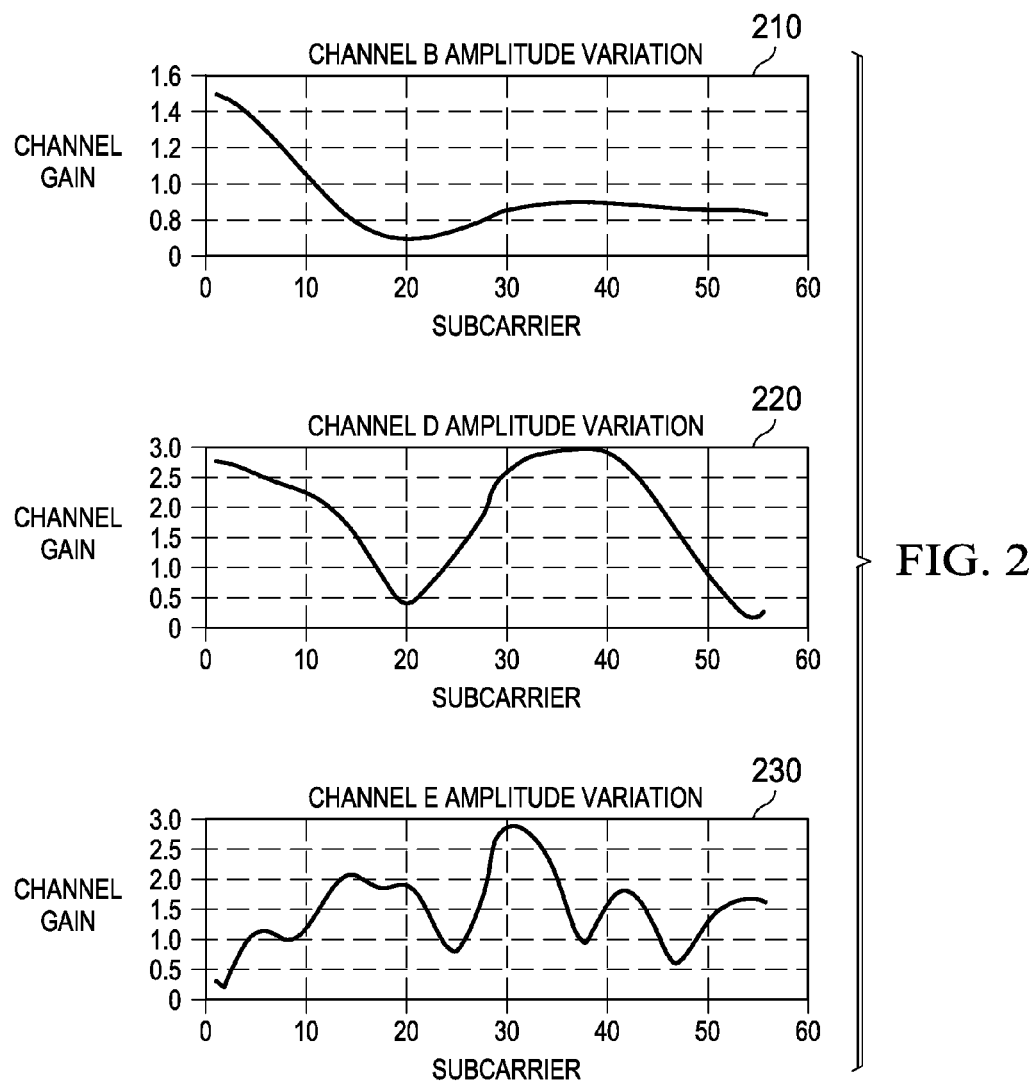
FIG. 2 illustrates an example of channel magnitude variation across sub-carriers or tones.

In this example, the goal of classifier embodiments is to determine the type of channel (e.g., high, medium, or low frequency selectivity) seen by a transmitter/receiver pair. To illustrate the point, consider an 802.11n system where channel models B, D and E are low, medium and high frequency selective channels, respectively. It will be appreciated that further information regarding such channel models may be found in Vinko Erceg, et al., IEEE P802.11 Wireless LANs "TGn Channel Models". For the sake of simplicity, and not by way of limitation, assume the 802.11n system comprises a single link, one transmitter/one receiver system where the selected channel statistic for each sub-carrier is the channel magnitude. FIG. 2 illustrates an example channel magnitude variation across sub-carriers for a single random realization of the different channel models 210, 220 and 230, corresponding to channel models B, D and E, respectively, of this example. Clearly, there is a progressive increase in the channel magnitude variation across the sub-carriers for channels B (210), D (220), and E (230). It should be understood that although this discussion divides the classification into three categories, namely high, medium and low, this should in no way limit the present disclosure or attached claims—e.g., more categories are possible.

Figure 3:
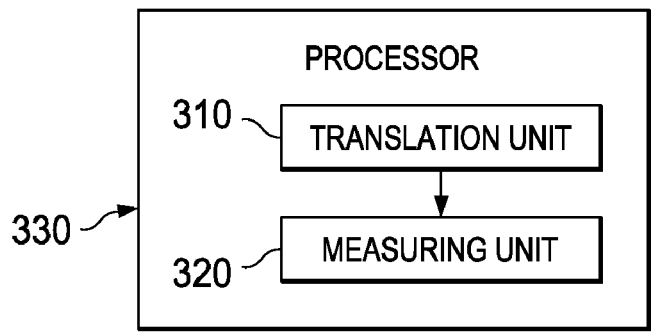
FIG. 3 illustrates an example channel classifier according to some embodiments.

FIG. 3 illustrates an example embodiment of a channel classifier 300, comprising translation unit 310, measurement unit 320, and processor 330. It should be appreciated that although this example embodiment illustrates translation unit 310 and measurement unit 320 as part of processor 330, that other arrangements are possible, e.g., combining the functions of translation unit 310 and measurement unit 320 into a single unit, having processor 330 perform all of the functions of translation unit 310 and measurement unit 320 in addition to processor 330's functions, providing one or both of translation unit 310 and measurement 320 separate from processor 330, etc. It should be understood that operations carried out by translation unit 310, measurement unit 320 or processor 330 can alternatively be performed in software or by an application-specific integrated circuit (ASIC). In the present example embodiment of FIG. 3, processor 330 classifies the type of channel being observed based on outputs from the measurement and translation units. Translation unit 310 translates the set of at least one particular channel statistic across sub-carriers into a set of channel statistics that captures the variation, or rate of variation, in the channel. Measurement unit 320 quantifies and measures this variation or rate of variation. Based on the output from measurement unit 320, sometimes referred to herein as a measurement value, processor 330 makes a decision on the type of channel being observed. In some embodiments processor 330 classifies the type of channel being observed on the basis of a comparison of values received from measurement unit 320 with at least one threshold. Based on the channel classification, some embodiments of processor 330 determine an amount of information to transmit to a beamformer. In some such embodiments, the amount of information may comprise which modulation and coding scheme (MCS) the transmitter is to use. In other such embodiments, the amount of information may comprise the number of feedback bits required to convey steering matrix information for explicit transmit beamforming. In yet other such embodiments the amount of information may comprise steering matrices to be used for implicit transmit beamforming.

As an example, some embodiments quantify the frequency selectivity by counting the number of valleys and peaks the channel statistic exhibits across the sub-carriers. A valley is a point where the channel statistic is a minima when viewed across subcarriers whereas a peak is a point where the channel statistic is a maxima when viewed across subcarriers. In some such embodiments, a translation unit maps the channel statistic from each of a plurality of sub-carriers into a sequence of ones and zeros where the numeric value one ("1") denotes a peak or a valley; of course, it should be understood that a logical 1 maybe be represented by any value. Some embodiments of such a translation unit perform this operation by computing a difference of the channel statistic for the two pairs of three adjacent sub-carriers, for all groups of three consecutive sub-carriers, and assigning a numeric value one ("1") to the output if there is a sign-change in the difference. Another way of thinking of this is described in equations (1) and (2). Some embodiments of the measuring function (e.g., measurement unit 320) may comprise a zero-crossing counter that counts the number of non-zero entries. It should be appreciated that the number of zero entries could instead be counted. The ones (or zeros) are tallied and the total is output as a value. The value may then be compared against at least one threshold to classify the channel. In one embodiment, if the input statistic for each sub-carrier is a vector; the vector statistics for all the sub-carriers are first stacked column-wise into a matrix. Differentiation, in some embodiments followed by a sign change comparison, and zero-crossing counting are performed on either all rows or a subset and the sufficient statistic used for classification is the sum of the zero crossing counters (ZCCs). Equations (1) and (2) mathematically describe these operations. Specifically, define $$C(w, x, y) = \begin{cases} 1 & \text{if } (w-x)(x-y) < 0 \\ 0 & \text{if } (w-x)(x-y) \geq 0 \end{cases} \quad (1)$$

Then decision statistic is given by $$Z = \sum_{k=0}^{|N_{sub}|-2} \sum_{l=1}^{N} C(s_k(l), s_{k+1}(l), s_{k+2}(l)) \quad (2)$$

where $s_k$ is an N×1 vector denoting the channel statistics for the $k^{th}$ sub-carrier, $s_k(l)$ is the $l^{th}$ element of $s_k$, and $S=\{s_k\}_{k=1 \ldots N_{sub}}$ is the set of channel statistics. The output of the respective ZCC is then compared with a predefined set of thresholds and a classification of the channel is made. The thresholds are preferably computed offline and are a function of type of channel statistic being considered, the number of sub-carriers being considered, and the number of transmit/receive antenna links in the system.

It should be noted that a differentiation operation on the channel statistics need not be performed for only the adjacent sub-carriers. In some embodiments, in order to minimize computational complexity, a high pass filtering operation such as a differentiation operation may be performed for the channel statistics on every $M^{th}$ sub-carrier where (M>1) i.e., only the channel statistics for every $M^{th}$ sub-carrier is processed by the channel classifier.

Figure 4:
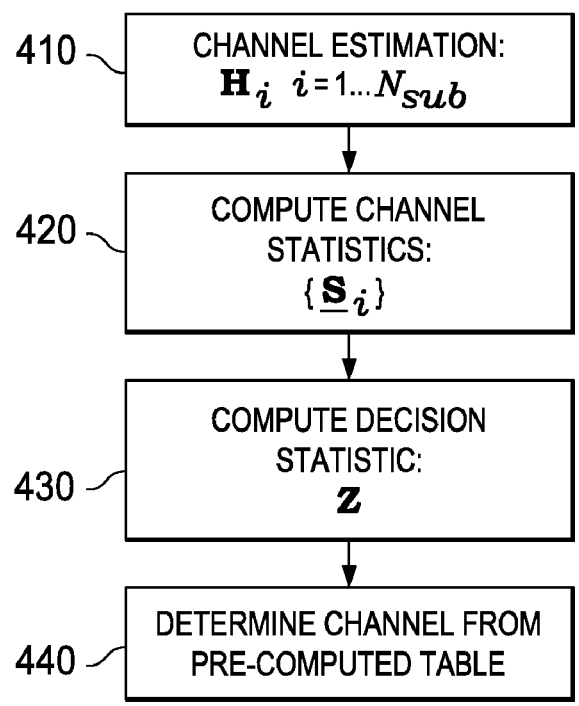
FIG. 4 illustrates a classification flowchart according to embodiments.

A flowchart describing operation of some embodiments is shown in FIG. 4. Specifically, the channel matrix $H_i$ is estimated for each sub-carrier, where i=1 ... $N_{sub}$ (block 410). The set of channel statistics, $\{S_i\}$, is computed from the channel $H_i$ (block 420). The decision statistic, Z, is computed from the set of channel statistics (block 430). The decision statistic value is then compared to a pre-computed table of values to determine or classify the channel (block 440).

As one example, and not by way of limitation, consider a 4×4 MIMO-OFDM system with 64 QAM sub-carrier modulation scheme; there are 16 independent transmit/receive links, and 64 sub-carriers. In this example, the desired statistic to be used is the channel magnitude. The channel statistic for each tone is first determined by stacking the columns of the channel matrix for each sub-carrier into a vector and computing the magnitude of each entry. For each of the three different models B, D, and E, 2000 different channel realizations were generated and passed through a channel classifier embodiment. The histogram plot in FIG. 5 shows the results. Based on the clear clumping of points, one can clearly and quickly differentiate among the different channel models, for example channel B (510), channel D (520), and channel E (530) in illustrative example FIG. 5. Specifically, based on the following decision rules or thresholds (for this particular example, and not by way of limitation):

when Z (the total number of zero crossings) is less than 60, the channel type is classified as channel model B (low frequency variation).

when Z (the total number of zero crossings) is greater than or equal to 60 up to less than or equal to 122, the channel type is classified as channel model D (medium frequency variation).

when Z (the total number of zero crossings) is greater than 122, the channel type is classified as channel model E (high frequency variation).

It should be understood that translation and measurement unit embodiments discussed above which count the number of valleys and peaks are not the only ones which may be used for channel classification. For example, in some embodiments the translation unit may only consist of a differentiator or a high-pass filter replacing the differentiator. Likewise, the measurement unit may consist of a moments-based estimator (e.g., a variance estimator, etc.) instead of a zero-crossing counter.

Depending on the type of channel statistic being used as an input to the channel classifier, other classification embodiments include, but are not limited to:

computing the moments (e.g., variance) of the channel statistic and then comparing with a set of thresholds; in some embodiments this computation is performed by the measuring unit. It should be understood that in some embodiments, thresholds are computed offline.

computing a difference among adjacent sub-carriers' channel statistics; in some embodiments the differentiator of this computation is part of a translation unit, while in some embodiments of this computation, the differentiator is the entirety of a translation unit preprocessing the set of channel statistics for example by subtracting the mean of the channel statistic across tones. In some embodiments, the preprocessing operation is followed by, for example and not by way of limitation, the differentiator approach discussed herein, the differentiator and sign change comparison approach discussed herein, etc. In some embodiments the preprocessing operation is performed by the translation unit.

Thus, embodiments solve the problems identified by prior techniques and provide additional advantages. Embodiments classify the type of channel to, among other uses, determine the amount of feedback information beamformee 150 should transmit to beamformer 110. Moreover, by classifying the type of channel as described herein, system costs can be reduced because expensive Inverse Fast Fourier Transform (IFFT) processing to measure the delay spread can be avoided.

Many modifications and other embodiments will come to mind to one skilled in the art to which this invention pertains having the benefit of the teachings presented in the foregoing descriptions, and the associated drawings. Therefore, the above discussion is meant to be illustrative of the principles and various embodiments of the disclosure; it is to be understood that the invention is not to be limited to the specific embodiments disclosed. Although specific terms are employed herein, they are used in a generic and descriptive sense only and not for purposes of limitation. It is intended that the following claims be interpreted to embrace all such variations and modifications.

What is claimed is:

1. An orthogonal frequency-division multiplexing (OFDM) system, comprising:
    a hardware processor configured to:
        quantify a frequency selectivity in a channel by calculating a difference in a magnitude of a channel and angle between adjacent sub-carriers of a plurality of sub-carriers in a frequency domain;
        determine the peaks (maxima) and the valleys (minima) in at least one of the channel magnitude and angle across a plurality of sub-carriers and count a number of zero-crossings;

comparing the number of zero-crossings to at least one threshold to classify the channel; and a transmitter for transmitting an amount of information to a beamformer based on the channel classification.

2. The system of claim 1, wherein the OFDM system is a multiple-input, multiple-output (MIMO) OFDM system.

3. The system of claim 1, wherein the at least one threshold is computed offline.

4. The system of claim 1, wherein the amount of information comprises a modulation and coding scheme (MCS) the transmitter is to use.

5. The system of claim 1, wherein the amount of information comprises a number of feedback bits required to convey steering matrix information.

6. The system of claim 1, wherein the amount of information comprises steering matrices to be used.

7. A method for classifying channels in an OFDM system, comprising:

quantify a frequency selectivity in a channel by calculating a difference in a magnitude of a channel and angle between adjacent sub-carriers of a plurality of sub-carriers in a frequency domain;

determine the peaks (maxima) and the valleys (minima) in at least one of the channel magnitude and angle across a plurality of sub-carriers and count a number of zero-crossings;

comparing the number of zero-crossings to at least one threshold to classify the channel; and transmitting an amount of information to a beamformer based on the channel classification.

\* \* \* \* \*